FIG. 5

INVENTORS:
JOHN B. BARTHOLOMEW
PETER P. MORISON
BY
Browne, Schuyler & Beveridge
ATTORNEYS Jan. 11, 1966  J. B. BARTHOLOMEW ET AL  3,229,107
APPARATUS FOR MOVING ARTICLES ONE BY
ONE TO AND FROM A PROCESSING STATION
Filed Aug. 14, 1962  7 Sheets-Sheet 6

INVENTORS:
JOHN B. BARTHOLOMEW
PETER P. MORISON
BY
Browne, Schuyler & Beveridge
ATTORNEYS

United States Patent Office 3,229,107
Patented Jan. 11, 1966

3,229,107
APPARATUS FOR MOVING ARTICLES ONE BY ONE TO AND FROM A PROCESSING STATION
John B. Bartholomew and Peter P. Morison, both of Cambridge, Cambridgeshire, England, assignors to Spillers Limited, London, England, a British company
Filed Aug. 14, 1962, Ser. No. 216,916
Claims priority, application Great Britain, Aug. 17, 1961, 29,668/61
13 Claims. (Cl. 250—223)

The present invention relates to apparatus for handling a succession of discrete articles and is especially applicable to the handling of pieces of dough or dough-like material.

In mass or continuous production processes conditions sometimes arise where apparatus at one station in a process treats articles in batches rather than individually with the result that articles reaching a succeeding processing station are often spaced at random and not uniformly. If the articles are dealt with individually at the succeeding station it often becomes desirable that they should be spaced more uniformly or that they should be presented to that succeeding station individually, one by one. If, at one station, articles are treated for example in pairs and delivered on to a conveyor for transit to a succeeding station at which they are treated individually, the spacing between one pair of articles which were treated together may be considerably less than the spacing between the last article of one batch and the first article of a succeeding batch and the spacing between any two articles may, in terms of time, be less than the time required for treating an individual article at the succeeding station.

According to one feature of the present invention apparatus for handling a succession of random spaced articles and feeding them one by one to a processing station in timed relation with the removal of articles therefrom, comprises delivery means for receiving articles and feeding them one by one to the processing station, reciprocable means for removing each article from the processing station, drive means for the delivery means, means responsive to the passage of each article into the processing station for initiating a processing operation thereon therein, control means responsive to completion of said processing operation for initiating operation of said reciprocable means, and control means responsive to operation of said reciprocable means for controlling the operation of said delivery means.

The delivery means may be in the form of a continuously operable conveyor together with a compartmented storage means indexed to present successive compartments to receive an article and subsequently discharge it to the processing station.

Thus according to another feature of the present invention, apparatus for handling a succession of random spaced articles, such as pieces of dough or dough-like material and feeding them, one by one, to a delivery or processing station in timed relationship with the removal of articles therefrom, comprises compartmented storage means, drive means for indexing the storage means to present successive compartments first at an article-receiving station and later at an article-discharge station, and control means for initiating the stopping of said drive means and responsive to the removal of an article from the processing station and the passage of an article discharge station to the processing station.

In another embodiment the delivery means is in the form of a conveyor which can be driven continuously or, in the event of one article following too closely upon another, intermittently.

Thus according to a still further feature of the present invention apparatus for handling a succession of random spaced articles and feeding them one by one to a processing station in timed relation with the removal of articles therefrom, comprises conveyor delivery means, for receiving articles and feeding them one by one to the processing station, selectively engageable and disengageable drive means for said conveyor means, means responsive to the passage of each article into the processing station for initiating a processing operation thereon therein, reciprocable means for removing each article from the processing station, control means responsive to the completion of said processing operation, for initiating operation of said reciprocable means, means responsive to the passage of each article on said conveyor means at a location spaced in advance of said first mentioned article passage responsive means, and control means responsive to operation of said reciprocable means and to said article passage responsive means for controlling the disengagement and the re-engagement of said drive means.

Each means responsive to the passage of an article may conveniently be photoelectric means. The control means preferably includes multivibrators and by employing transistors wherever possible it is possible to provide a substantially entirely static control system in which the only moving parts are power operated. A piston and cylinder mechanism may be employed for driving the reciprocable means which may conveniently also serve as article receiving means at the processing station. Such article receiving means is preferably in the form of a saucer-shaped container which is displaceable from a normal position in a generally horizontal plane into a position in a generally vertical plane whereby to enable articles to be discharged therefrom by gravity.

Where compartmented storage means is employed it is generally in the form of a paddle wheel and comprises a roller or cylinder provided with a plurality of substantially equi-angularly spaced paddles or vanes extending generally radially therefrom, each compartment being defined partly by two adjacent vanes or paddles and preferably also by part of the outer surface of the cylinder or roller. The axis of the paddle wheel is preferably at a level intermediate the level of conveying means feeding articles thereto and the level of the delivery or processing station so that articles can fall under gravity into a compartment. On rotation of the paddle wheel through a predetermined angle, that compartment is brought into a discharge station from which the article can fall, under gravity, to the delivery or processing station.

Four paddles or vanes are provided around the roller or cylinder which is displaced through substantially 90° to transfer a compartment from the receiving station to the discharge station. Preferably interlock means are provided for arresting the movement of the paddle wheel in predetermined positions. This may conveniently be effected by providing an apertured or slotted disc on the shaft of the paddle wheel and detecting the position of the disc, and thereby of the paddle wheel, photoelectrically. The drive to the paddle wheel may conveniently include an electromagnetically operated brake and clutch unit.

The further processing of the articles at the delivery or processing station may take the form of assessing the weight of an article, and apparatus according to the present invention is eminently suitable for handling dough pieces in the baking industry.

In Great Britain it is a statutory requirement that loaves of bread offered for sale should have a weight within prescribed limits. It is customary for dough to be divided into dough pieces in a dough divider and delivered to a hander-up, which passes them to a first prover.

Hitherto in many cases the problem of producing loaves of bread each of specified weight has been solved mainly by manually weighing at frequent intervals dough pieces delivered by the divider to the hander-up and by adjusting the setting of the dough divider accordingly. The weight of the dough pieces bears an arbitrary relationship to the desired value of the weight of the finished loaf in order to compensate for losses in weight in processing following dividing. A difficulty arises from the fact that dough divider is essentially a volumetric device and not a weight device and that changes in the setting of the dough divider produces a change in the volume of a dough piece rather than essentially in its weight. It is found, in practice, that there are always variations in the form of scatter on either side of the mean weight of loaves and as it is a statutory requirement that no loaf should be underweight, it is conventional to adjust a dough divider so that variations in operation of the dough divider are such that even a dough piece at the lower limit of scatter will be of sufficient weight. By weighing all dough pieces and automatically segregating dough pieces which are under a predetermined weight, it is possible for the dough divider to be adjusted to give a slightly lower mean weight and for underweight dough pieces to be returned to the dough divider for reprocessing and the excess dough which is at present permitted in dough pieces in order to ensure that no loaf is below the prescribed minimum weight, can be materially reduced, thereby enabling greater uniformity to be obtained in the weight of finished loaves.

One type of conventional dough divider cuts dough pieces from a large mass into pairs and delivers one pair with each cycle of operations. The dough pieces are delivered to a conveyor with the result that the physical spacing between a pair of dough pieces produced during one cycle of operations of the divider is much less than the physical separation between that pair and the first of the following pair. In one known type of weighing, the weight of each pair of dough pieces is assessed conjointly and such an arrangement does not permit the rejection of an individual dough piece if it is underweight. The combined weight of both dough pieces in a pair may be within prescribed limits. It is, therefore, advantageous to assess the weight of each dough piece individually.

In order that each dough piece can be weighed individually by a weighing head, it is necessary to provide some separation primarily in time between adjacent dough pieces, in order that each dough piece may be presented to the weighing head for a sufficient length of time to enable a weighing operation to be completed. In United States patent application Serial No. 160,780, now Patent No. 3,179,069, there is disclosed an additional additional adjusting mechanism for a dough divider and in United States patent application Serial No. 216,823 there is disclosed an error correcting system suitable for operating said additional adjusting mechanism.

The invention will be further described by way of example with reference to the accompanying drawings, in which.

In a conventional arrangement in a bakery, dough pieces indicated diagrammatically at 11 are delivered from a hander-up or umbrella moulder on to a conveyor band indicated generally at 12 which normally conveys the dough pieces to a first proving machine.

Figure 1:
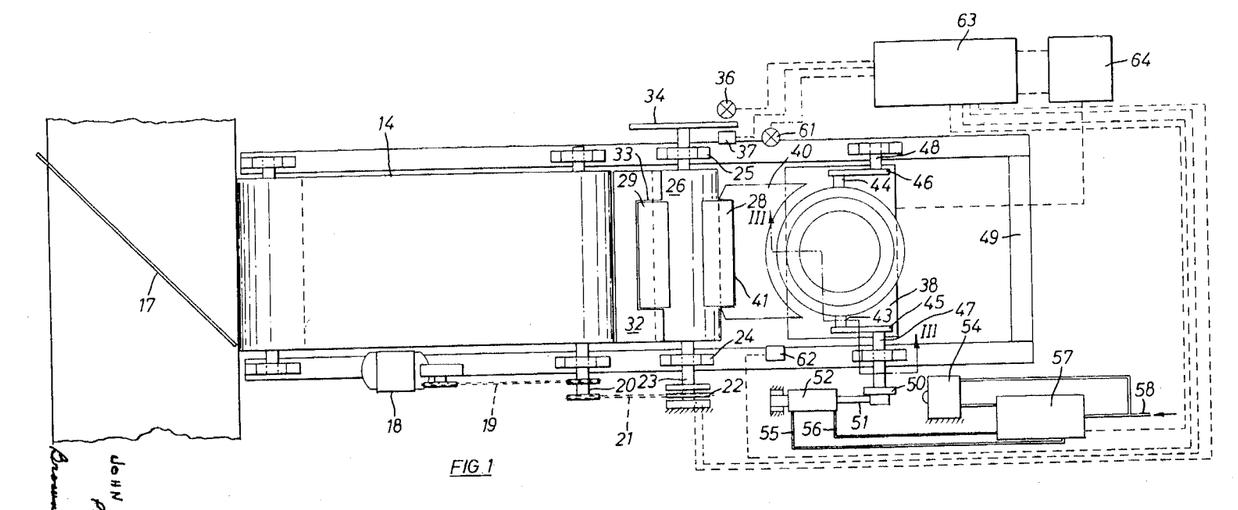
FIG. 1 is a plan view of one embodiment of the invention with certain parts removed for the sake of clarity.
Figure 2:
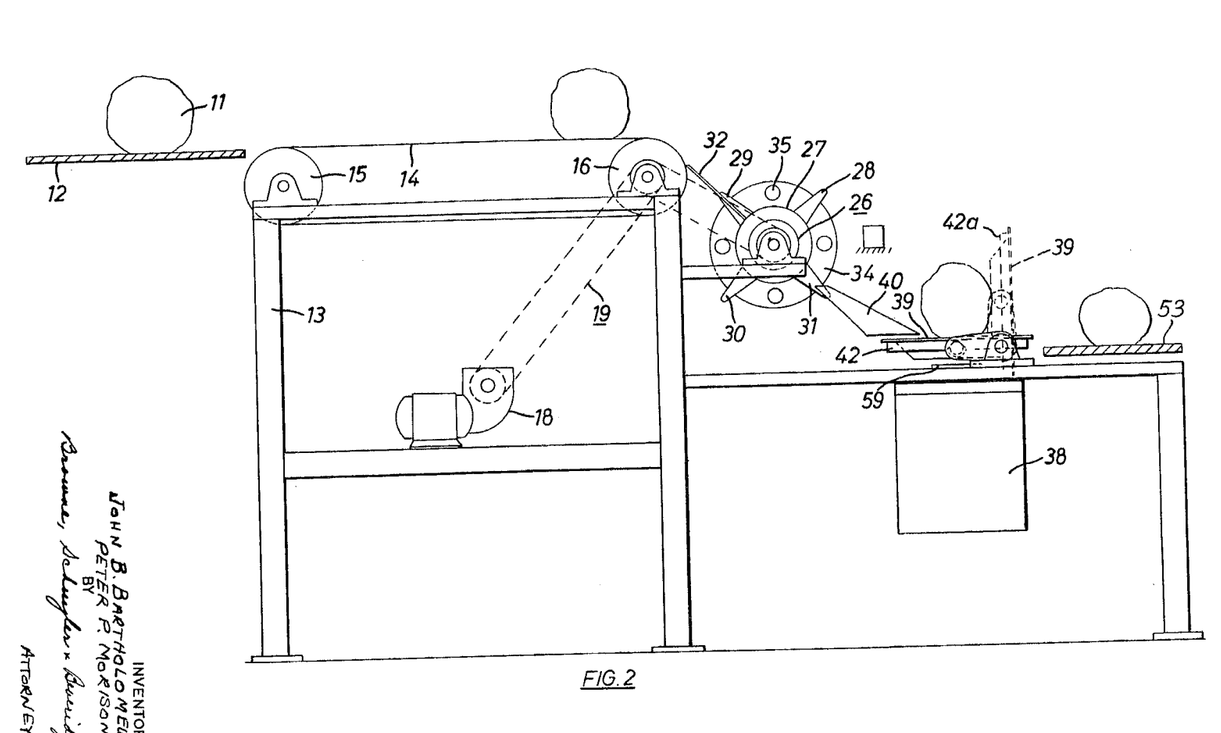
FIG. 2 is a side elevation of the embodiment of FIG. 1 with certain parts omitted for the sake of clarity.

In the illustrated embodiment of the present invention a conveyor belt 14 carried on an idler roller 15 and a driving roller 16 journalled in bearings on a support framework 13 has its upper run at substantially the same height as the conveyor hand 12 and dough pieces are diverted from the band 12 to the conveyor 14 by a transfer gate 17. The driving roller 16 is driven by a variable speed drive 18 through a drive indicated generally at 19. From shaft 20 of the roller 16 a drive 21 leads to an electromagnetically operated clutch and brake unit 22 on shaft 23 journalled in bearings 24, 25, and carrying a paddle wheel 26. The paddle wheel 26 comprises a roller or cylinder 27 from which four paddles or vanes 28, 29, 30, 31 extend generally radially. Each adjacent pair of vanes, together with part of the outer surface of the cylinder or roller 27 defines a compartment for receiving a dough piece. The axis of the shaft 23 is beyond the end of the conveyor 14 and is at a lower level. A chute 32 having its lower portion cut away as at 33 to permit passage of the vanes or paddles of paddle wheel 26 provides a path for dough pieces from the conveyor 14 into a compartment of paddle wheel 26 which serves as compartmented storage means. The shaft 23 also carries a disc 34 provided with four apertures 35, the disc and apertures being located in the path of the beam of light from a lamp 36 on to a photo-sensitive element 37 such as a photo-transistor.

A second lamp 61 is arranged to project a beam of light across the path of a dough piece from a compartment of the paddle wheel 26 on to the container 39 and on to a second photoelectric device 62, such as a photo-transistor.

At a delivery or processing station there is provided a weighing head 38 above which is located a container 39. The container 39 disposed beyond the paddle wheel 26 and is at a level below that of the shaft 23 and a second chute 40, having its upper edge cut away as at 41 to permit passage of the vanes or paddles of the paddle wheel 26 provides a path for dough pieces from a compartment of the paddle wheel 26 to the container 39. Container 39 is carried on an annular ring 42 carried by stub shafts 43, 44 and cranks 45, 46 connected to a driving shaft 47 and a support shaft 48 respectively journalled in bearings on the framework extension 49. The shaft 47 carries a crank 50 to which is connected piston rod 51 of a pneumatic piston and cylinder mechanism 52. With the piston retracted, the crank 50 and the annular ring 42 are in the position shown in solid lines in FIG. 2. When the piston is displaced the shaft 47 is rotated in a clockwise direction, as seen in FIG. 2, to bring the ring 42 into the position 42a indicated in broken lines in FIG. 2 to thereby enable a dough piece on the container 39 to be discharged therefrom, under gravity, on to a return conveyor band 53.

Disposed in the path of the piston rod 51 for operation at or near the extremity of its outward travel, is a pneumatic trip valve 54. The opposite ends of the piston and cylinder mechanism 52 are connected by lines 55, 56, to a pneumatic control valve 57 leading to an air supply line 58. The valve 57 includes a solenoid-operated valve for operating the valve into one terminal position in which air from line 58 is passed to line 55, to expel the piston rod, whilst actuation of the trip valve 54 brings about the operation of the valve 57 into its reverse terminal position to supply air from line 58 to line 56 and retract the piston rod.

The weighing head 38 includes a platform 59 which upon initiation of a weighing operation, is raised to engage the underside of the container 39. Whilst the weighing head may be of any known type, that illustrated by way of example is a known type in which current through a moving coil in a magnetic field and which is displaceable under the weight of an article to be weighed is varied in order to retain the coil in a given position after having been displaced therefrom by the weight of an article, the displacement of the coil from said given position being detected photoelectrically. The relative positions of the container 39, annular ring 42 and the weighing head 38 are such that when the coil is in said given position, the container 39 is lifted free from the annular ring 42 and the weighing head therefore responds to the combined head of the dough piece and the container 39, allowance being made for the inherently constant weight of the container 39. When a weighing operation is completed, the valve 57 is operated and the container moved from a horizontal plane into a vertical plane. In order to restrain the container 39 from falling, it is provided, as may be more clearly seen in FIG. 3, with a pair of loop-shaped members 60, which pass round the stub shafts 43, 44. Each of the loops 60 is provided with an aperture of such size and shape that no interference with the shafts 43, 44 occurs during an actual weighing operation.

In operation the conveyor 14 is driven such that it has linear speed slightly in excess of the linear speed of the band 12, so that successive dough pieces transferred from the band 12 to the conveyor 14, are partially separated from one another with respect to distances between them. Upon reaching the end of the conveyor 14 a dough piece falls, under gravity, down the chute 32 into a compartment on the paddle wheel 26. If the container 39 is in its horizontal position and empty and ready to receive a dough piece, the electromagnetic clutch and brake unit 22 is energized to connect shaft 23 to the drive 21 and rotate the paddle wheel 26 in a clockwise direction, as seen in FIG. 2. The drive of the paddle wheel 26 is preferably arranged so that the linear velocity of the surface of the roller 27 is slightly higher than the linear velocity of the conveyor 14. As the paddle wheel rotates the dough piece falls therefrom under gravity down the chute 40 on to the container 39 and in so falling interrupts the beam of light from the lamp 61 to the photo-transistor 62 which sends a control signal to control unit 63.

Control unit 63 sends a start signal to a weighing unit 64 associated with the weighing head 38. The weighing head and weighing unit now assess the weight of the dough piece and the container 39. When the paddle wheel has reached a predetermined angular position as detected by the photo-transistor 37 in conjunction with the disc 34, the control means 63 energizes the clutch and brake unit 22 to disconnect shaft 23 from drive 21. When a further dough piece is received by the conveyor 14, it is allowed to pass, under gravity, into another compartment of the paddle wheel 26 which is now stationary. When the weighing operation is completed the weighing unit 64 delivers a weighing complete signal to the control unit 63 which energizes the solenoid of the solenoid operated valve of valve 57 to operate valve 57 and cause the piston and cylinder mechanism 52 to rotate shaft 47 carrying the container 39 in a clockwise direction, as seen in FIG. 2, and bring the container 39 into a generally vertical position so that the dough piece therein can fall, under gravity, on to the conveyor 53. At the end of its stroke the piston rod 51 operates the trip valve 54 to reverse the valve 57 and return the container to its normal position. The control unit 63 now causes the electromagnetically operated brake and clutch unit 22 to re-engage the drive to the shaft 23 and rotate the paddle wheel 26 until such time as another dough piece falls down the chute 40 and intercepts the beam of light falling on the photo-transistor 62, whereupon the cycle of operations is repeated. Dough pieces delivered on to the conveyor 53 and which are within the prescribed weight limits as determined by the weighing unit 64, may be passed forward for subsequent processing, for example by being returned on to a later part of the conveyor band 12 whilst dough pieces which are under weight are preferably diverted from the conveyor 53 by means, not shown, and may then be returned to the dough divider for re-division.

A conventional dough divider can operate at speeds of up to 30 cycles per minute thus producing up to 30 pairs of dough pieces per minute. A known type of weigher requires about 500 milliseconds for actually assessing the weight of a dough piece, but to this must be added time taken for setting a dough piece onto the weigher and subsequently removing it therefrom, resulting in an overall cycle time approaching one second for the weigher. Whilst this is compatible with the speed of operation of a divider, it is desirable that the dough pieces should be presented to the weigher in sequence and in timed relationship with the cycle time of the weigher. It will be appreciated that the apparatus of the present invention promotes this.

Though in the illustrated embodiment the drive for the conveyor 14 and the paddle wheel 26 is shown as a variable speed drive 18, it is also envisaged that the drive may be taken from the dough divider so as to enable the speed of the drive to be more satisfactorily maintained in relation to the speed of the dough divider.

Figure 3:
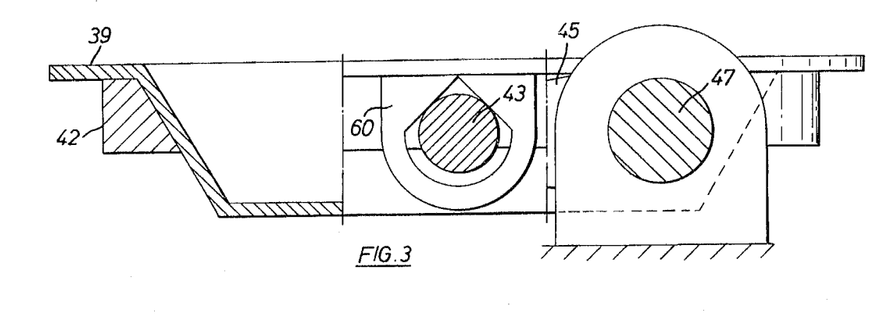
FIG. 3 is a detail section along the line III—III of FIG. 1.
Figure 4:
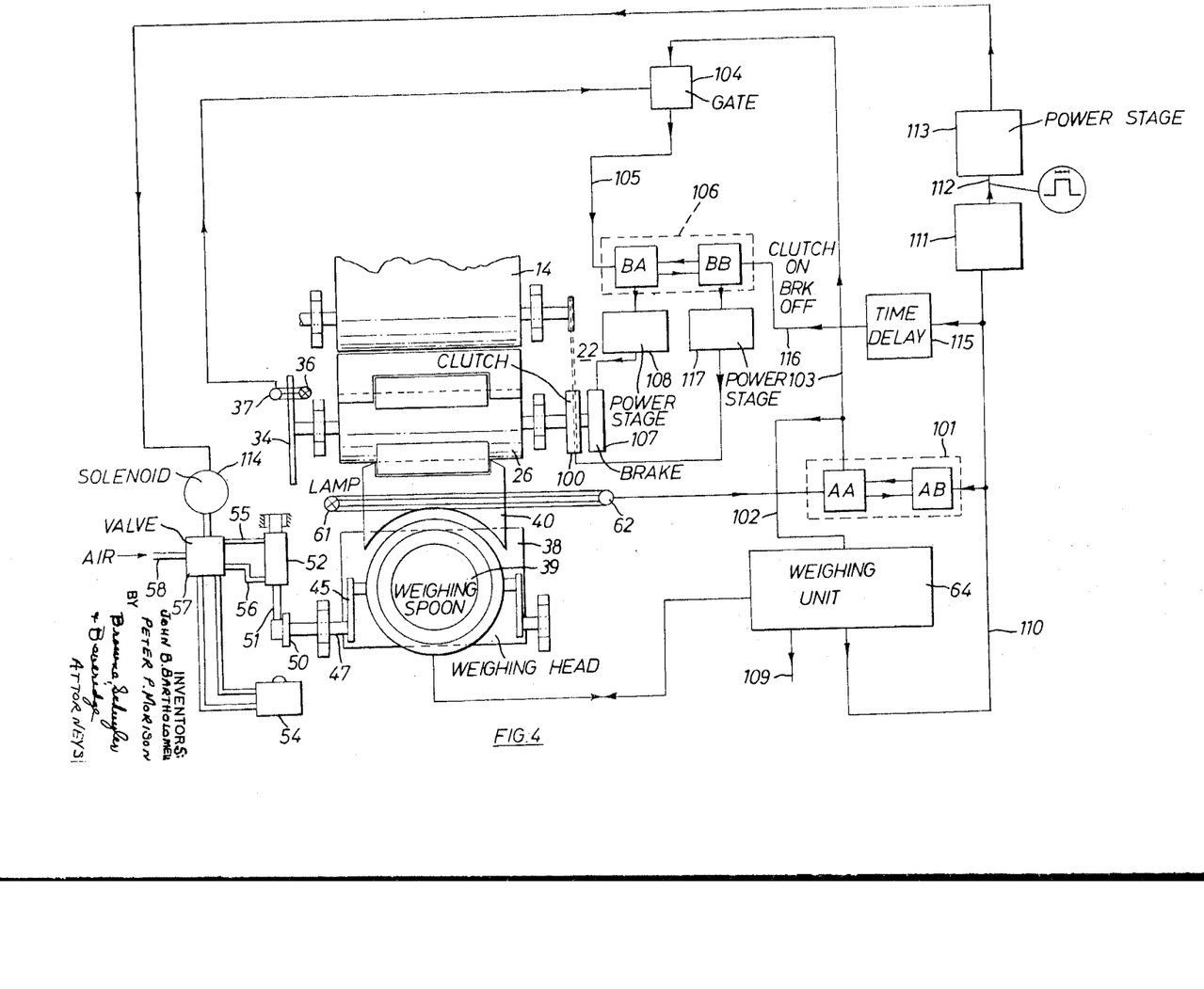
FIG. 4 is a block diagram of one suitable control system.

One convenient form of control for the apparatus of FIGS. 1 to 3 is illustrated diagrammatically in FIG. 4. It is convenient to describe the sequence of operations from after the container 39 has been returned to its normal or horizontal position. With the conveyor 14 in operation, and clutch engaging winding 100 of the electromagnetically operated clutch and brake unit 22 is energized, the clutch is engaged and the paddle wheel 26 is rotated. When the first dough piece is received on the conveyor 14, and falls under gravity into a compartment of the paddle wheel 26, and it subsequently falls out of the compartment down the chute 40 on to the container 39 and interrupts the beam of light from the lamp 61 on to photo-transistor 62. A signal from photo-transistor 62 triggers first stage AA and re-sets second stage AB of a bi-stable multi vibrator 101 which delivers a starting pulse on line 102 to the weighing unit 64 to initiate a weighing operation. It also sends a signal on line 103 to a gate 104. When the paddle 26 has reached a predetermined position a beam of light from the lamp 36 passes through one of the holes 35 in the disc 34 on to the photo-transistor 37. A signal from the photo-transistor 37 is applied to the gate 104 to permit the signal on line 103 to pass on line 105 to a second bi-stable multi vibrator 106. The signal on line 105 triggers first stage BA and resets second stage BB. The clutch engaging winding 100 is now de-energized and the brake engaging winding 107 energized through a power stage 108. The paddle wheel 26 is, therefore, arrested in a predetermined position ready to receive another dough piece.

When the weighing operation is completed, the weighing unit 64 delivers on line 109 an output signal indicative of the weight of the dough piece and such signal may be used in any manner desired, for example in the manner described in United States patent application Serial No. 216,823 to correct the setting of the dough divider and/or to reject an underweight dough piece. The weighing unit 64 also delivers a weighing complete pulse on line 110 to trigger a mono-stable multi vibrator 111. The mono-stable multi vibrator 111 delivers a pulse of controlled length on line 112 and this through a power stage 113, is applied to solenoid 114 of the solenoid operated valve of the valve 57. Valve 57 is now operated to pass air from line 58 to one end of the cylinder of the piston and cylinder 52 and expel the piston rod from the cylinder and, through crank 50, shaft 47, and crank 45, tilt the container 39 into a vertical position so that the dough piece can fall therefrom under gravity. At the completion of this stroke the piston rod 51 operates the trip valve 54 to effect reversal of the valve 57 to supply air from line 58 through line 56 to the other end of the cylinder of the piston and cylinder mechanism 52 to cause the container 39 to be returned to its horizontal position.

The weighing complete pulse on line 110 is also passed through a time delay device 115 in the form of a monostable multi vibrator which, after a time delay sufficient to allow for the displacement and return of the container 39, passes a pulse on line 116 to the bi-stable multi vibrator 106. At this stage the container 39 is available to receive another dough piece. The second stage BB of the multi vibrator 106 is triggered and the first stage BA re-set. The brake engaging winding 107 is now de-energized and the clutch engaging winding 100 is energized through power stage 117. The drive is re-connected to the paddle wheel 26 which now rotates. If the next compartment has not already received a dough piece, the rotation of the paddle wheel will continue until a dough piece is received and falls therefrom down the chute 40 on to the container 39 and interrupts the beam of light from the lamp 61 to the photo-transistor 62, whereupon the cycle of operations is repeated.

Figure 5:
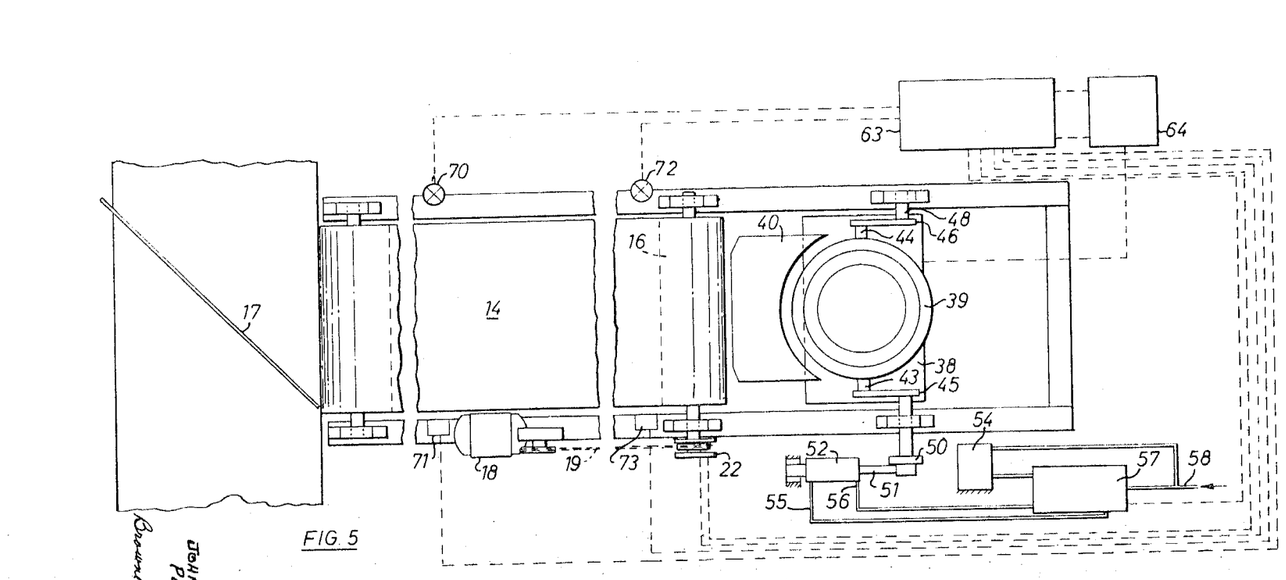
FIG. 5 is a plan view of another embodiment of the invention with certain parts removed for the sake of clarity.
Figure 6:
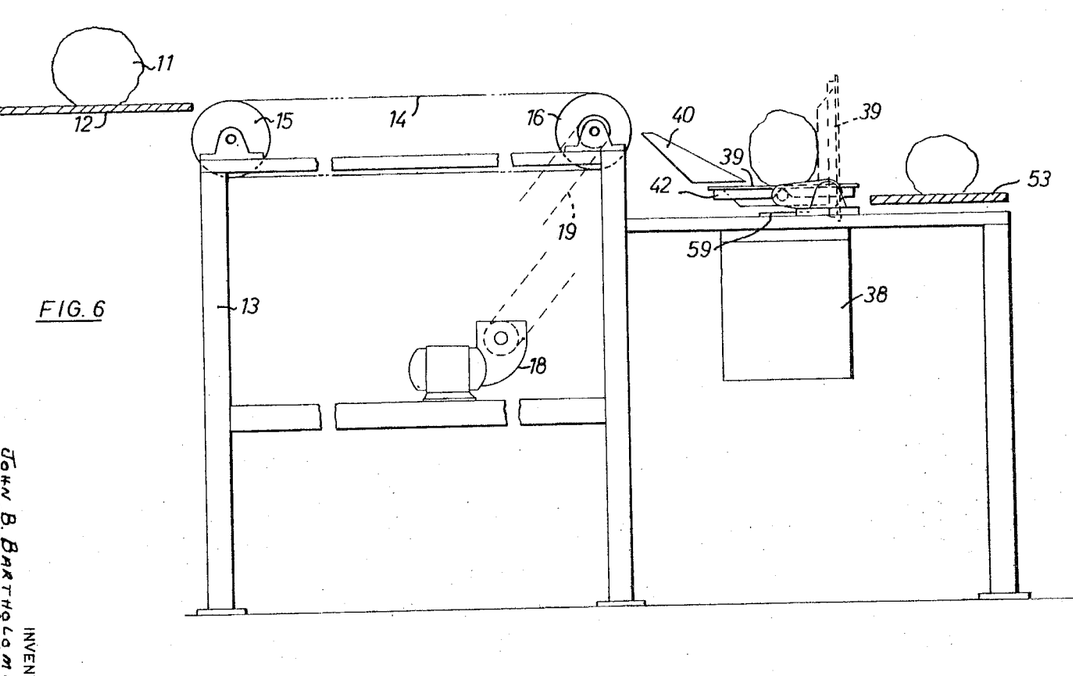
FIG. 6 is a side elevation of the embodiment of FIG. 5 with certain parts removed for the sake of clarity.
Figure 7:
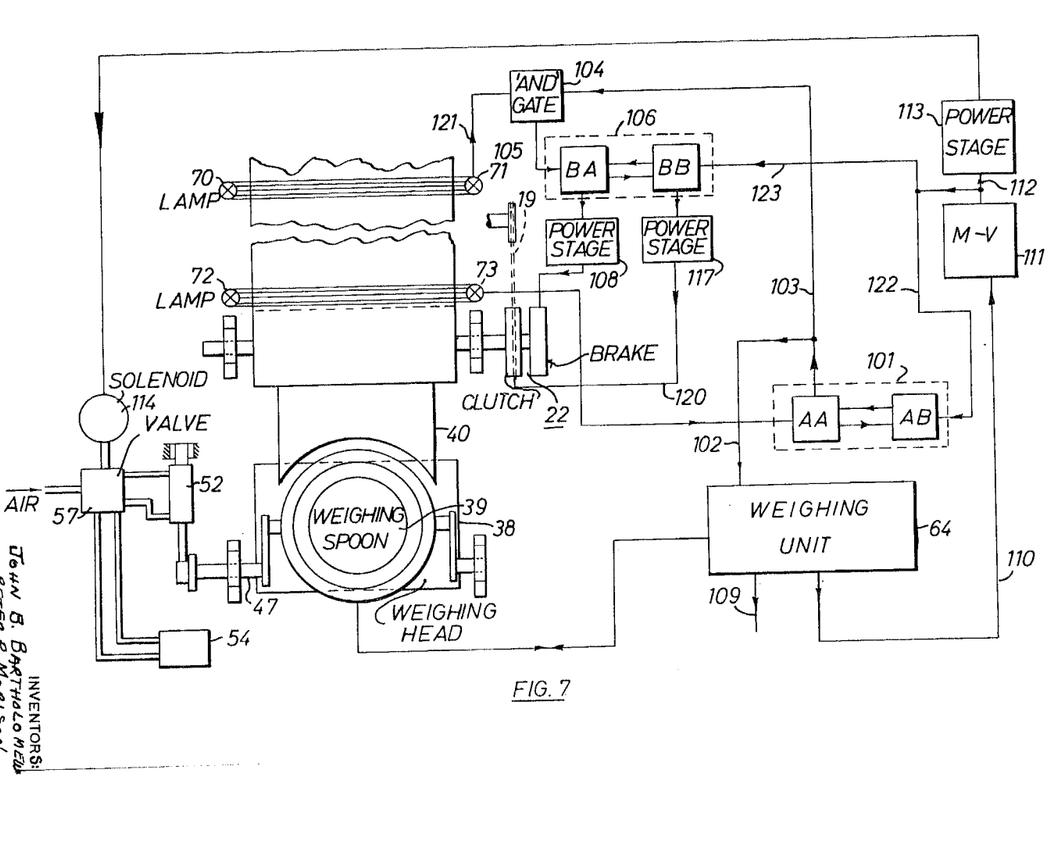
FIG. 7 is a block diagram of one suitable control system of the embodiment of FIGS. 5 and 6.

In the second embodiment illustrated in FIGS. 5, 6, and 7 there is a simpler arrangement in that it is possible to eliminate the paddle wheel 25 of the first embodiment and permit the conveyor 14 to deliver dough pieces to the container 39 whilst providing for the drive to the conveyor 14 to be interrupted in the event of a following dough piece approaching the container before the preceding one has been discharged therefrom.

In the second embodiment the conveyor belt 14 is carried on the idler roller 15 and the driving roller 16 and has its upper run substantially at the same height as the conveyor band 12. The electromagnetically operated clutch and brake unit 22 is, however, now associated with the roller 16 and is driven by the variable speed drive 18 through the transmission 19. At the processing station there is provided the weighing head 38 and the container 39 at a level below that of the upper run of the conveyor belt 14 and the chute 40 provides a path for dough pieces to fall under gravity from the belt 14 to the container 39. The container 39 is carried on the annular ring 42 with which are associated the stub shafts 43, 44, the cranks 45, 46, the support shaft 48, the framework extension 49, the crank 50, the piston rod 51 and the pneumatic piston and cylinder mechanism 52, the pneumatic trip valve 54, the lines 55, 56, the valve 57, and the line 58 as hereinbefore described in connection with the embodiment illustrated in FIGS. 1 to 4. Associated with the weighing head 38 is the weighing unit 64; the weighing head, weighing unit, container 39 and associated parts function as previously described.

Two lamps 70, 72 are arranged to project beams of light across the path of dough pieces along the conveyor 14 on to photoelectric devices 71, 73 such as photo-transistors, and are disposed the second adjacent the driving roller end of the conveyor belt 14, and the other an appropriate distance in advance thereof.

In operation the conveyor 14 is driven such that it has a linear speed slightly in excess of the linear speed of the band 12. A dough piece on conveyor 14 interrupts the beams of light falling on photo-transistors 71, 73 and provided that the container 39 is empty and ready to receive it, falls under gravity down the chute 40 into the container 39. The photo-transistor 73 sends a control signal to the control unit 63 which in turn sends a start signal to the weighing unit 64. The weighing head and weighing unit now assess the weight of the dough piece and the container 39. When the weighing operation is completed the weighing unit 64 delivers a weighing complete signal to the control unit 63 which causes the solenoid operated valve of valve 57 to be operated and cause valve 57 to be operated to effect rotation of the shaft 47 carrying the container 39 in a clockwise direction as seen in FIG. 6 to bring the container 39 into a generally vertical position and enable the dough piece therein to fall under gravity on to the conveyor 53, the container then being returned to its normal position as previously described in readiness to receive a following dough piece whereupon the cycle of operations is repeated.

If, however, a following dough piece should be approaching too soon and interrupt the beam of light falling on the photo-transistor 71 before the weighing operation has been completed on the preceding dough piece, a signal sent to the control unit 63 by the photo-transistor 71 causes the control unit 63 to energise the clutch and brake unit 22 to interrupt the drive to the conveyor 14 and halt the progress of such following dough piece. When the weighing complete signal is subsequently received by the control unit, in addition to causing operation of the valve 57 as previously described, the control unit 63 also energises the clutch and brake unit 22 to re-establish the drive to the conveyor 14. The lamp 70 and photo-transistor 71 are positioned sufficiently far in advance of the lamp 72 and photo-transistor 73 in relation to the speed of the conveyor 14 and the speed of operation of the piston and cylinder mechanism 52 such that the container will have been moved into its discharge position and returned to its normal position before the following dough piece interrupts the beam of light falling on the photo-transistor 73 and falls on to it down the chute 40. Likewise the lamp 72 and the photo-transistor, though indicated in an arbitrary position for the sake of clarity in FIG. 5, are it will be understood, suitably positioned to allow a dough piece to arrive on the container 39 before a weighing operation commences.

One convenient form of control for the apparatus illustrated in FIGS. 5 and 6 is illustrated diagrammatically in FIG. 7 and is a modification of the form of control illustrated in FIG. 4, and includes two bi-stable multi-vibrators 101, 106, and "AND" gate 104, a mono-stable multi-vibrator 111, and power stages 108, 113 and 117.

It is convenient to describe the sequence of operations after the container 39 has been returned to its normal or horizontal position and is ready to receive a dough piece. Under such conditions the second stages AB and BB of the multi-vibrators 101, 106 are conducting and the clutch of the clutch and brake unit 22 is energised through the power stage 117 so that, with the variable speed drive 18 operating, the conveyor 14 is being driven to feed dough pieces to the container 39. As the first dough piece interrupts the beam of light falling onto the photo-transistor 71 the resulting signal on line 121 is ineffective since at this time the gate 104 is closed. When the dough piece interrupts the beam of light falling on the photo-transistor 73 a control signal is sent on line 120 to the multi-vibrator 101 to trigger the first stage AA and reset the second stage AB and cause a start signal to be sent to the weighing unit 64 on line 102, and also an open signal to be sent to the gate 104 on line 103. The weighing unit 64 now commences a weighing operation and when that is completed sends out an output signal on line 109 indicative of the weight of the dough piece and such signal may be used in the manner described for example in United States patent application Serial No. 216,823 to correct the setting of the dough divider and/or to reject an underweight dough piece. The weighing unit also delivers a weighing complete signal on line 110 to the multi-vibrator 111 to trigger it to deliver a pulse of controlled length on line 112 to power stage 113 for operation of the solenoid 114 of the solenoid operated valve of valve 57 which then operates to cause the container to be displaced and returned to its normal position as previously described. The pulse on line 112 is also applied on line 122 to the multi-vibrator 101 to reset it and also on line 123 to the multi-vibrator 106 to reset it if, as will be subsequently described, it had previously been triggered. The container 39 is now in a position to receive a following dough piece whereupon the sequence of operations will be repeated.

If, however, a following dough piece should approach the container 39 before the weighing operation has been completed and the container displaced and returned, upon interruption of the beam of light falling on the photo-transistor 71, the signal delivered on line 121 passes through the gate 104 to the multi-vibrator 106 via line 105 since with the triggering of the first stage AA of the multi-vibrator 101 when the preceding dough piece interrupted the beam of light falling on the photo-transistor 73 and fell on to the container 39, the open signal was applied to the gate 104 on line 103. The signal on line 105 triggers the first stage BA of the multi-vibrator 106 and resets the second stage BB. The clutch of the clutch and brake unit 22 is no longer energised and through power stage 108 the brake is energised so that the conveyor 14 is stopped. When the multi-vibrator 111 delivers a pulse on lines 112, 122 and 123 subsequent to the receipt of a weighing complete signal on line 110, the multi-vibrator 106 is reset and the second stage then energises the clutch of the clutch and brake unit 22 through power stage 117 whilst the brake is de-energised The drive to the conveyor is then re-established and the following dough piece advanced towards the container 39 which will then be ready to receive it. When the following dough piece interrupts the beam of light falling on the photo-transistor 73 the sequence of operations follows as previously described.

By using transistors for the multi-vibrators, gate, time delay and power stages in the control systems of FIG. 4 and/or FIG. 7, it is possible to provide a substantially entirely static control system in which the only moving parts are power operated, thereby enabling the apparatus to operate at a speed compatible with the speed of operation of the weighing head and weighing unit.

We claim:

1. Apparatus for handling a succession of random spaced articles and feeding them one by one to a processing station in timed relation with the removal of articles therefrom, comprising intermittently operable delivery means for receiving articles and feeding them one by one to the processing station, a container at said processing station for receiving articles, an annular member carrying said container, sidewardly projecting members on said annular member, stirrup-like members on said container surrounding said sidewardly projecting members to provide a limited freedom of movement of the container in a vertical direction relatively to the annular member when the annular member is in a normal generally horizontal position, stub axles, means for journalling said stub axles about a generally horizontal axis, cranks secured to said stub axles and to said sidewardly projecting members, a driving crank secured to one of said stub axles, a pneumatic piston and cylinder mechanism operatively connected to said driving crank for angularly displacing said annular member about asid axis from its normal generally horizontal position to a displaced generally vertical position for the discharge of an article from the container under gravity, means responsive to the passage of each article into said container for initiating a processing operation thereon whilst resting therein, control means responsive to the completion of said processing operation for initiating operation of said piston and cylinder mechanism, trip means for reversing the operation of said piston and cylinder mechanism upon completion of movement of said annular member into said displaced position, and control means for controlling the operation of said delivery means.

2. Apparatus for handling a succession of random spaced articles and feeding them one by one to a processing station in timed relation with the removal of articles therefrom, comprising intermittently operable compartmented storage means, drive means for indexing the storage means to present successive compartments first at an article receiving station and later at an article discharge station, a container at said processing station for receiving each article from said discharge station, an annular member carrying said container, sidewardly projecting members on said annular member, stirrup-like members on said container surrounding said sidewardly projecting members to provide a limited freedom of movement of the container in a vertical direction relatively to the annular member when the annular member is in a normal generally horizontal position, stub axles, means for journalling said stub axles about a generally horizontal axis, cranks secured to said stub axles and to said sidewardly projecting members, a driving crank secured to one of said stub axles, a pneumatic piston and cylinder mechanism operatively connected to said driving crank for angularly displacing said annular member about said axis from its normal generally horizontal position to a displaced generally vertical position for the discharge of an article from the container under gravity, trip means responsive to the completion of movement of said annular member into said displaced position for reversing the operation of said piston and cylinder mechanism, means responsive to the passage of each article into said container for initiating a processing operation thereon whilst resting therein, control means responsive to the completion of said processing operation for initiating operation of said piston and cylinder mechanism, and control means for initiating the stopping and starting of said drive means and responsive to the article passage responsive means and to said first mentioned control means.

3. Apparatus for handling a succession of random spaced articles and feeding them one by one to a processing station in timed relation with the removal of articles therefrom, comprising intermittently operable conveyor delivery means for receiving articles and feeding them one by one to the processing station, selectively engageable and disengageable drive means for said conveyor means, a container at said processing station, means responsive to the passage of an article into said container for initiating a processing operation thereon whilst resting therein, an annular member carrying said container, sidewardly projecting members on said annular member, stirrup-like members on said container surrounding said sidewardly projecting members to provide a limited freedom of movement of said container relatively to said annular member in a generally vertical direction when said annular member is in a normal generally horizontal position, stub axles, means for journalling said stub axles about a generally horizontal axis, cranks secured to said stub axles and to said sidewardly projecting members, a driving crank secured to one of said stub axles, a piston and cylinder mechanism operatively connected to said driving crank for angularly displacing said annular member about said horizontal axis from said normal position to a displaced generally vertical position for the discharge of an article from the container under gravity, trip means for reversing the operation of said piston and cylinder mechanism upon completion of movement of said annular member into said displaced position, control means responsive to the completion of said processing operation for initiating operation of said piston and cylinder mechanism, means responsive to the passage of an article on said conveyor means at a location in advance of said first mentioned article passage responsive means, and control means responsive to said last mentioned article passage responsive means and to said first mentioned control means for controlling the disengagement and the re-engagement of said drive means.

4. Apparatus for handling a succession of random spaced articles and feeding them one by one to a processing station in timed relation with the removal of articles therefrom, comprising intermittently operable delivery means for receiving articles and feeding them one by one to the processing station, drive means for delivery means, a paddle wheel in said delivery means, said paddle wheel comprising a cylindrical member journalled for rotation about a horizontal axis, a plurality of equi-angularly spaced radial vanes extending from said cylindrical member, electromagnetically operable clutch and brake means connecting said cylindrical member to said drive means and position responsive means for in part controlling said brake and clutch means, reciprocable means for removing each article from said processing station, means responsive to the passage of each article into the processing station for initiating a processing operation thereon whilst resting therein, and operating said brake and clutch mechanism to stop said cylindrical member, control means responsive to the completion of said processing operation for initiating operation of said reciprocable means and operating said brake and clutch mechanism to restart said cylindrical member.

5. Apparatus according to claim 4 in which said position responsive means comprises an apertured disc rotatable in synchronism with said cylindrical member, said disc being apertured at a number of localities equal in number to the number of radial vanes, photo-responsive means, and light transmitting means for directing a beam of light along a path containing the path of said apertures.

6. Apparatus for handling a succession of random spaced articles and feeding them one by one to a processing station in timed relation with the removal of articles therefrom, comprising an intermittently operable cylindrical member journalled for rotation about a substantially horizontal axis, a plurality of substantially radially extending vanes equi-angularly around said cylindrical member, said cylindrical member and vanes serving as a compartmented storage means, with each adjacent pair of vanes and part of the surface of said cylindrical member defining three walls of a compartment, drive means for indexing said cylindrical member to present successive compartments at an article receiving station and later at an article discharge station, means responsive to the angular position of said cylindrical member, electromagnetically operable clutch and brake means in said drive means for starting and stopping rotation of said cylindrical member, means responsive to the passage of an article from a compartment to said processing station for initiating a processing operation thereon whilst resting therein and in co-operation with said position responsive means for initiating operation of said clutch and brake means to stop rotation of said cylindrical member, and second control means responsive to the removal of an article from said processing station for initiating operation of said clutch and brake means to restart rotation of said cylindrical member.

7. Apparatus according to claim 6 in which said position responsive means comprises photo-responsive means, an apertured disc rotatable in synchronism with said cylindrical member and apertured at a number of localities equal in number to the number of radial vanes, and light transmitting means for directing a beam of light onto said photo-responsive means along a path containing the path of said apertures.

8. Apparatus for handling a succession of random spaced articles and feeding them one by one to a processing station in timed relation with the removal of articles therefrom, comprising intermittently operable compartmented storage means, drive means for indexing said storage means to present successive compartments first at an article receiving station and later at an article discharge station, means responsive to the position of said compartmented storage means, means responsive to the passage of an article from said discharge station to said processing station, reciprocable means for removing an article from said processing station, gate means, a first bi-stable multi-vibrator triggered by said article passage responsive means for initiating a processing operation on an article in said processing station and opening said gate and reset on completion of said processing operation, a second bi-stable multi-vibrator controlling said drive means and triggered by said position responsive means through said gate for interrupting said drive means, and a mono-stable multi-vibrator triggered upon completion of said processing operation for initiating operation of said reciprocable means and resetting said second bi-stable multi-vibrator for re-establishing said drive means.

9. Apparatus as claimed in claim 8 in which said article passage responsive means comprises light responsive means and light transmitting means for projecting a beam of light onto said light responsive means along a path interrupted by an article passing from said discharge station to said processing station, and in which said position responsive means comprises light responsive means, an apertured disc movable in synchronism with said storage means and light transmitting means for projecting a beam of light onto said last mentioned light responsive means along a path interrupted by said apertured disc.

10. Apparatus for handling a succession of random spaced articles and feeding them one by one to a processing station in timed relation with the removal of articles therefrom, comprising intermittently operable conveyor delivery means for receiving articles and feeding them one by one to the processing station, selectively engageable and disengageable drive means for said conveyor means, first means responsive to the passage of each article into said processing station, reciprocable means for removing each article from said processing station, second means responsive to the passage of each article on said conveyor means at a location spaced in advance of said first article passage responsive means, gate means, a first bi-stable multi-vibrator triggered by said first article passage responsive means for initiating a processing operation on an article in said processing station and opening said gate, a second bi-stable multi-vibrator for controlling said drive means and triggered by said second article passage responsive means through said gate for disengaging said drive means, and a mono-stable multi-vibrator for initiating operation of said reciprocable means and resetting said first and multi-vibrator to close said gate means and resetting said second bi-stable multi-vibrator to re-engage said drive means and triggered in response to completion of said processing operation.

11. Apparatus as claimed in claim 10 in which each of said first and second article passage responsive means comprises light responsive means and light transmitting means for projecting a beam of light onto said light transmitting means along a path interrupted by the passage of an article.

12. Apparatus for handling a succession of random spaced dough pieces and feeding them one by one to a weighing station in timed relation with the removal of dough pieces therefrom, comprising intermittently operable delivery means for receiving articles and feeding them one by one to the weighing station, drive means for the delivery means, a paddle wheel in said delivery means, said paddle wheel comprising a cylindrical member journalled for rotation about a horizontal axis, a plurality of equi-angularly spaced generally radial vanes extending from said cylindrical member, electromagnetically operable clutch and brake means connecting said cylindrical member to said drive means, first light responsive means, an apertured disc rotatable in synchronism with said cylindrical member, first light transmitting means for projecting a beam of light onto said first light responsive means along a path interrupted by said apertured disc, a container at said weighing station for receiving each dough piece, weighing means at said weighing station, an annular member carrying said container, sidewardly projecting members on said annular member, stirrup-like members on said container surrounding said sidewardly projecting members to provide a limited freedom of movement of the container relatively to the annular member in a vertical direction when the annular member is in a normal generally horizontal position, stub axles, means for journalling said stub axles about a generally horizontal axis, cranks secured to said stub axles and to said sidewardly projecting members, a driving crank secured to one of said stub axles, a piston and cylinder mechanism operatively connected to said driving crank for angularly displacing said annular member about said horizontal axis from said normal position to a displaced generally vertical position for the discharge of a dough piece from the container under gravity, trip means responsive to the completion of movement of said annular member into said displaced position for reversing the operation of said piston and cylinder mechanism, second light responsive means, second light transmitting means for projecting a beam of light onto said second light responsive means along a path interrupted by the passage of a dough piece from said delivery means into said container, gate means, a first bi-stable multi-vibrator triggeringly responsive to said second light responsive means for initiating operation of said weighing means and opening said gate and re-settingly responsibe to weighing completed signal from said weighing means, a second bi-stable multi-vibrator triggeringly responsive to said first light responsive means through said gate for operating said clutch and brake means to interrupt said drive means, and a mono-stable multi-vibrator triggeringly responsive to said weighing complete signal for initiating operation of said piston and cylinder mechanism and resetting said second bi-stable multi-vibrator for operating said clutch and brake means to re-establish said drive means.

13. Apparatus for handling a succession of random spaced dough pieces and feeding them one by one to a weighing station in timed relation with the removal of dough pieces therefrom, comprising intermittently operable conveyor delivery means for receiving dough pieces and feeding them one by one to the weighing station, drive means for said conveyor means, electromagnetically operable clutch and brake means in said drive means, a container at said weighing station, weighing means at said weighing station, first light responsive means, first light transmitting means for projecting a beam of light onto said first light responsive means along a first path interrupted by the passage of a dough piece from said conveyor means onto said container, second light responsive means, second light transmitting means for projecting a beam of light onto said second light responsive means along a second path interrupted by the passage of a dough piece on said conveyor means at a location in advance of said first path, an annular member carrying said container, sidewardly extending members on said annular member, stirrup-like members on said container surrounding said sidewardly extending member to provide a limited freedom of movement of said container relatively to said annular member in a vertical direction when the annular member is in a normal generally horizontal position, stub axles, means for journalling said stub axles about a generally horizontal axis, cranks secured to said stub axles and to said sidewardly extending members, a driving crank secured to one of said stub axles, a piston and cylinder mechanism operatively connected to said driving crank for angularly displacing said annular member about said horizontal axis from said normal position to a displaced generally vertical position for the discharge of a dough piece from the container under gravity, trip means responsive to the completion of movement of the annular member into said displaced position for reversing operation of said piston and cylinder mechanism, gate means, a first bi-stable multi-vibrator triggeringly responsive to said first light responsive means for initiating operation of said weighing means and opening said gate, a second bi-stable multi-vibrator triggeringly responsive to said second light responsive means through said gate for operating said sidewardly extending members to provide a limited means from said conveyor means, and a mono-stable multi-vibrator triggering responsive to a weighing complete signal from said weighing means for initiating operation of said piston and cylinder mechanism and re-setting said first bi-stable multi-vibrator to close said gate means and re-setting said second bi-stable multi-vibrator for operating said clutch and brake means to re-engage said drive means to said conveyor means.

References Cited by the Examiner

UNITED STATES PATENTS

| | | | |
|---|---|---|---|
| 1,938,104 | 12/1933 | Jennings | 250—223 X |
| 2,171,130 | 8/1939 | Merrifield | 250—223 X |
| 2,417,642 | 3/1947 | Gilchrist et al. | 250—223 X |
| 2,652,167 | 9/1953 | Havener | 250—223 X |
| 2,933,185 | 4/1960 | Coleman et al. | 209—111.5 |
| 2,965,050 | 12/1960 | Doering | 250—83.4 |
| 2,984,352 | 5/1961 | Gilman | 209—111.5 |
| 3,035,694 | 5/1962 | Hirschfield et al. | 250—219 |
| 3,052,353 | 9/1962 | Pritchett | 209—111.5 |

RALPH G. NILSON, *Primary Examiner.*

F. M. STRADER, *Examiner.*

E. STRICKLAND, J. D. WALL, *Assistant Examiners.*